United States Patent [19]

Kopf

[11] Patent Number: 4,788,236

[45] Date of Patent: Nov. 29, 1988

[54] PROCESS FOR PRODUCING PARTICULATE NOVOLAC RESINS AND AQUEOUS DISPERSIONS

[75] Inventor: Peter W. Kopf, Hillsborough Township, Somerset County, N.J.

[73] Assignee: Union Carbide Corporation, Danbury, Conn.

[21] Appl. No.: 657,474

[22] Filed: Oct. 4, 1984

Related U.S. Application Data

[63] Continuation of Ser. No. 335,448, Dec. 29, 1981, abandoned.

[51] Int. Cl.⁴ .............................................. C08L 61/00
[52] U.S. Cl. .................................... 524/55; 524/596; 524/841; 524/904
[58] Field of Search ............... 524/55, 541, 596, 841, 524/143, 501

[56] References Cited

U.S. PATENT DOCUMENTS

| 3,823,103 | 7/1974 | Harding | 260/17.2 |
| 4,026,848 | 5/1977 | Harding et al. | 260/17.2 |
| 4,115,327 | 9/1978 | Kikuga et al. | 260/17.2 |
| 4,206,095 | 1/1980 | Wynstra et al. | 260/17.2 |
| 4,420,571 | 12/1983 | Blickensderfer et al. | 523/149 |

OTHER PUBLICATIONS

Chem. Abstracts 83, 194,336f, Takiyama et al. (Japan), 8/5/75.

*Primary Examiner*—Theodore E. Pertilla
*Attorney, Agent, or Firm*—Jean B. Mauro

[57] ABSTRACT

Particulate novolac resins and aqueous dispersions are produced by condensing phenol with aldehyde using acid catalysis. Following neutralization, particulate novolac resin is formed by adding protective colloid to the aqueous mixture. Resin particle isolation can be aided by dephenolation.

4 Claims, No Drawings

4,788,236

PROCESS FOR PRODUCING PARTICULATE NOVOLAC RESINS AND AQUEOUS DISPERSIONS

This application is a continuation of U.S. application Ser. No. 335,448, filed 12/29/81, now abandoned.

BACKGROUND OF THE INVENTION

1. Field of the Invention

This invention relates to a process for producing particulate novolac resins, and the novolac resins so produced. The production of stable aqueous dispersions of novolac resins is also provided.

2. Description of the Prior Art

The prior art has disclosed procedures for preparing stable aqueous dispersions of heat-hardenable, resole phenolic resins, such as in U.S. Pat. No. 3,823,103 (Harding). Procedures have also been utilized for the preparation of particulate resole resins isolated from aqueous dispersions, such as those discribed in U.S. Pat. No. 4,206,095 (Wynstra et al.). These processes produced resole resins more efficiently and safely than other prior art processes. Also, since the product is in the particulate state, intensive grinding is not required.

It would be desirable if a similar procedure could be developed for the preparation of particulate novolac resins, as opposed to the production of particulate resole resins as described in the prior art. There exists, however, significant differences between the two basic types of phenolic resins, i.e., novolacs and resoles, as are well known to those skilled in the art. If the phenolic resins are prepared with an excess of formaldehyde and an alkaline catalyst, the product will possess methylol side or end groups, and can be referred to as resoles or one-stage phenolic resins. The resole resins can be cured with heat through the condensation of the methylol groups, without the addition of curing agents. If, however, the phenolic resins are prepared with an acidic catalyst and less than a mole of formaldehyde per mole of phenol is utilized, the resin will be a phenol-ended chain polymer in which the phenolic groups are connected with methylene bridges located ortho and para to phenolic hydroxyl groups, will have the properties of being permanently soluble and fusible, and will cure only upon the addition of a curing agent. Since the addition of a curing agent is required, these novolac phenolic resins have been referred to as two-step resins. These differences in chemical structure, production methods, and physical properties make it difficult to predict whether certain procedures effective for the one type of resin, would be effective when applied to the other type.

Utilizing the procedures described for the production of particulate resoles, it was initially believed that producing and isolating novolac resins in particulate form from a suspension polymerization would be easier for the novolac than for a resole. This assumption is based on the fact that novolac resins have a higher glass transition temperature, and are therefore more sinter resistant. The novolac resins are also not heat reactive, as opposed to resole resins, such that the drying procedure should be less critical. In addition, it was believed that the novolac resins should be more hydrophobic than the resole resins since the novolac resin is higher in molecular weight and does not contain methylol groups. It was discovered, however, that some of these assumption are incorrect. For example, novolac resins were found to be more hydrophilic than the resoles produced by the particulate process. As a result, the novlac resin particles in aqueous dispersion would require the special handling as with the particulate resoles. It was also discovered that since the molecular weight of the novolac was higher than the resiole, the tendency to form fine particles was actually less because of the higher melt viscosity. It would, therefore, be desirable if a procedure could be worked out which overcomes these difficulties to thereby produce a viable, particulate novolac resin.

SUMMARY OF THE INVENTION

The present invention relates to a process for producing particulate novolac resin comprising the steps of: (a) condensing a phenol with an aldehyde in the presence of a catalyst under acidic conditions, to produce a novolac resin; (b) adding water before, during or after the condensation reaction in step (a) to provide a novolac resin/water mixture; (c) neutralizing the acid catalyzed novolac resin using a base; (d) forming a particulate novolac resin dispersion by adding an effective amount of protective colloid to the aqueous mixture; and (e) isolating the particulate novolac resin from the aqueous dispersion. The invention also relates to a particulate novolac resin produced by this process, as well as a particulate novolac resin in an aqueous dispersion comprising (1) the acid catalyzed condensation product of a phenol and an aldehyde; (2) a neutralizing agent; (3) a protective colloid; and (4) sufficient water to produce a resin-in-water dispersion.

DETAILED DESCRIPTION OF THE INVENTION

The invention resides in the discovery of an effective process for the production of particulate novolac resin and aqueous dispersions. The procedures for the particulate novolac resin production include condensation to produce phenolic resin, addition of a required amount of water to enable subsequent dispersion formation, neutralization of the condensed resin, particulate dispersion formation using a protective colloid, and isolation of the particulate resin. It was also discovered that dephenolation to remove unreacted phenol could improve particulate novolac resin isolation. The particulate novolac resin and aqueous dispersions that may be produced by these processes can exhibit desirable physical properties within a wide range of values, depending upon the particular end utilization of the particulate novolac product.

Condensation

The novolac phenolic resins, used to produce the aqueous dispersion and particulate resin of the present invention, are obtained by condensing a phenol with an aldehyde in the presence of an acid catalyst.

The phenol reactant can be a tri-functional phenol, such as monohydroxybenzene, m-cresol or resorcinol, or a tetra-functional phenol, such as 2,2-bis(4-hydroxyphenol)-propane ("bisphenol-A"). Para-substituted phenols such as a p-cresol, p-chlorophenol, and p-t-butylphenol, can also be used as well as other halogenated phenols. Preferred phenolic components include monohydroxybenzene, m-cresol and bisphenol-A.

Examples of aldehydes which can be condensed with the phenol listed above to produce the phenol-aldehyde resins are: formaldehyde in any of its available forms, i.e., formalin and paraformaldehyde; furfural and the like. The amount of aldehyde is generally about 0.6 to about 0.9 moles per mole of phenolic component, preferably about 0.75 to 0.85 moles per mole of phenolic component.

The condensation of the phenol and aldehyde is carried out in the presence of a catalyst under acidic conditions. When the condensation is carried out in an aqueous reaction medium, faster reaction rates are observed with the stronger acids having lower pH's. Water, formed either by condensation or added to enable formation of a dispersion, exerts an inhibiting effect on the reaction, and thus is a detriment in a particulate novolac process where the final resin is suspended in a continuous aqueous phase. To assist the condensation reaction to proceed rapidly, "micellar" type catalysis of novolac resins is preferred. "Micellar" catalysis utilizes a catalyst compound or surfactant assisting compound which has a structure capable of aiding interaction between the catalyst moiety and the reactants. Under this process, it was previously discovered that sodium xylene sulfonate was found to enhance the rate of oxalic acid catalysis of novolac resins. It has been found, however, that another catalyst system works exceedingly well, which employs a catalyst such as an alkylated diphenyl oxide that has been converted to a sulfonic acid or a corresponding salt. (When a salt is used, an acid, such as $H_2SO_4$, must be added to supply the necessary hydronium ions, i.e., to provide acidic conditions.) These type of compounds have the general structure of:

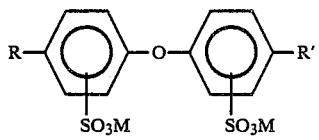

(I)

wherein R and R' are alkyl groups, preferably dodecyl, and M is hydrogen or a cationic equivalent, such as an alkali or alkaline earth metal. The preferred micellar catalysts are the dodecyl diphenyl oxides that have been converted to the sulfonic acid or its corresponding sodium salt. These compounds correspond to the structure in Formula I for when R and R' are dodecyl and M is hydrogen or sodium, respectively. These compounds, as well as other Formula I compounds, are available from the Dow Chemical Company under the trade name Dowfax. Illustrative of suitable alternate catalysts include sulfuric acid, oxalic acid, and phenol sulfonic acid, in addition to the sodium xylene sulfonate and Dowfax compounds listed above.

Dilution

A resin/water mixture is formed through the addition of water to the reaction mixture. The water can be added at any time before, during or after the condensation reaction. In a preferred embodiment, the condensation reaction is carried out in a principally organic medium. When the reaction is completed, water may be added. The minimum amount of water that should be used is that proportion which will permit the formation of a phenolic resin-in-water dispersion during the particulate formation step. While the minimum amount of water needed will vary somewhat from one formulation to another, as a rule at least 50 parts by weight of water should be provided for 100 parts by weight of phenolic resin. The weight of phenolic resin is equal to the weight of phenol, aldehyde, plus any other reactants charged to the reaction medium, minus the amount lost as water of condensation. A moderate excess over the minimum amount of water is recommended. There is no advantage to using a large excess, which is undesirable because reactor productivity will be reduced, although the process will be operable with a large excess of water. If water is not added prior to or during the condensation reaction, it is preferred that water be added before the condensed resin would cool or harden to a solid mass.

Neutralization

It was found that acid catalysis degrades or inactivates a protective colloid which is present during the condensation step such that particulate resin is not formed. Therefore, in order to form the novolac resin particles, the reaction must be neutralized prior to the addition of the protective colloid compound. Neutralization can be accomplished by the addition of a base, such as sodium hydroxide or potassium hydroxide, or its equivalent. The amount of base used to effect neutralization is approximately an equivalent amount to the acid used to generate the acid conditions present during the condensation reaction. It is preferred that the base is added in an amount sufficient to raise the pH to between about 5 to about 9, and most preferably to between about 6 to about 8.

Particulate Formation

In order to achieve particulate novolac resin formation, an effective amount of protective colloid is added to the resin subsequent to the neutralization step. It was discovered that the protective colloids useful for the production of particulate phenolic novolac reins are certain polysaccharides. Other materials used as protective colloids in the production of phenolic resole resins, such as partially hydrolyzed polyvinly alcohol, hydroxyethyl cellulose and carboxymethyl cellulose did not produce a particulate phenolic novolac resin. It was a completely unexpected discovery that not all the protective colloids used in the production of particulate resole resin are useful for the production of particulate novolac resin. The effectiveness of protective colloids in the production of particulate novolac and resole resins in summarized in Table 1 below.

TABLE 1

| EFFECTIVENESS OF PROTECTIVE COLLOIDS | | | | | | |
|---|---|---|---|---|---|---|
| | Novolac | | Resole | | Resole Dispersions | |
| Protective Colloid | Yes | No | Yes | No | Yes | No |
| Gum Arabic | x | | x | | x | |
| Gum Ghatti | x | | x | | x | |
| Gum Tragacanth | x | | x | | | x |
| Guar Gum | x | | | x | | x |
| Hydroxpropyl Guar | x | | x | | x | |
| Hydroxyethylcellulose | | x | x | | | x |
| Carboxymethyl-cellulose | | x | x | | | |
| Methylcellulose | | x | | x | | x |
| Methylhydroxypropyl Cellulose | | x | | x | | x |
| Hydroxypropyl Cellulose | | x | | x | | x |
| Polyvinylpyrollidone | | x | | x | | x |
| 99% Hydrolyzed Polyvinyl alcohol | x[1] | | | x | | x |
| 88% Hydrolyzed Polyvinyl alcohol | | x | x | | x | |

[1]Fused on cooling.

In some instances, it was discovered that certain protective colloids which had not been effective for achieving resole particle formation were effective for achieving novolac particle formation. In other instances, it was discovered that certain protective colloids which were not effective in achieving novolac particle formation were effective in achieving resole particle formation. Of those materials evaluated, the materials that were effective for the production of particulate novolac resins were the polysaccharides, such as gum arabic, gum ghatti, gum tragancanth, and guar gum and its hydroxypropylate derivative. There is at present no systematic explanation for the "effectiveness" of the particular protective colloids used in the formation of particulate resole and novolac resins. It is belived, that more in involved than simply surface activity and ionic versus nonionic character.

The effective amount of protective colloid will vary depending on the particular protective colloid utilized, the presence of a surfactant, the molecular weight of the novolac resin, as well as the mean particle size which is desired. Generally, about 0.1 to about 5 weight percent based on the amount of condensed resin, preferably about 0.5 to about 2 weight percent, and most preferably about 1 to about 2 weight percent of protective colloid is used.

Dephenolation

It was discovered that particulate novolac resin is difficult to recover when unreacted phenolic component is present in the resin in an amount of approximately 6 to 8 percent or more. This unreacted phenol causes a lowering of the glass transition temperature of the particles sufficient to cause the resin to fuse during subsequent isolation procedures. Particulate novolac resin was obtained, however, by instituting a dephenolation step process. After dephenolation, a higher glass transition temperature, and more sinter resistant particulate novolac resin is formed which would be readily isolated by subsequent procedures. The dephenolation step is carried out after the particles have been formed, and can encompass refluxing the reaction mixture under atmospheric conditions while collecting the distillate phenol and water in a separate receiver. The phenol, of couse, may be recycled in subsequent reactions. The distillation can be carried out with steam, or other refluxing conditions, which minimize the time required. Distillation is normally continued until the distillate volume reaches about 20 percent of the batch volume. Make-up water or aqueous decantate can be added to the reactor to prevent the batch viscosity from becoming too high. The dephenolation process is continued for a sufficient period of time in order to remove a sufficient amount of phenol, to less than about 6 percent as compared to the condensed resin, preferably less than 5 percent, and most preferably 2 to 4 percent, such that effective particle isolation can be achieved. Where the particulate novolac resin is not to be isolated from the dispersion, or where the formaldehyde factor is greater than about 0.8, or under such conditions that unreacted phenol is already present at less than 6 percent, the dephenolation procedure may not be necessary.

It should be noted that if the dephenolation step is conducted before the particulate formation step, it would not be possible to obtain as small a particle size as in the above described process due to the higher melt viscosity of the dephenolated resin thereby exhibiting greater resistance to particulate formation.

Isolation

The particulate novolac resin may be isolated using any known manner for isolating suspended particles from an aqueous dispersion. Such isolation can include filtration and drying, such as the use of vacuum filtration to obtain a cake containing 15 to 20 percent of moisture and then drying, e.g., using a rotary evaporator or fluid bed dryer, to obtain less than 3 percent moisture.

Adjuvants

Additional materials can be added to the reaction mixture, such as surfactants, antifoaming agents, lubricants, anti-caking additives, pigments, fillers, novolac hardners, and the like, in amounts well known to those skilled in the art.

Reaction Conditions

The condensation step may be conducted in about 1 to 6 hours, and preferably 2 to 4 hours, at a temperature of about 80° to 100° C., and preferably 95° to 100° C. The condensation will usually occur at atmospheric pressure although increased pressure may be utilized to permit the application of higher temperatures and therefore faster reaction rates. The dilution step should be carried out as rapidly as possible, but while maintaining a temperature greater than 80° C., and preferably greater than 90° C. The particulate formation step should be carried out under the same conditions as the dilution step, and may be combined with the dilution step once the mixture has been neutralized. The particulate formation step is most preferably conducted at a temperature greater than 95° C. The neutralization step is conducted over a period of time to avoid the rapid addition of base, using a base concentration of preferably at least 5 weight percent, but preferably no more than 25 weight percent. The time required will typically be about one hour, with the temperature kept at greater than 80° C., and preferably greater than 90° C. If magnesium hydroxide, calcium hydroxide, or other alkaline earth compound is utilized, it is usually added as slurry of about 10 to 25 weight percent, and may require more time after addition has been completed, such as about 2 to 4 hours, to complete neutralization. The temperature should be kept at above 80° C., the preferably above 90° C. The dephenolation step can be conducted either using direct distillation of phenol/water, or, more preferably, using stem distillation. The dephenolation will usually take about one-half to 4 hours, with 1 to 2 hours being preferred for maximum efficiency and control. The dephenolation is conducted at atmospheric pressure, and will not readily undergo increased pressure while retaining effective distillation. The filtration step will preferably utilize a reslurry or displacement wash, however, any effective filtration procedure known to one skilled in the art can also be utilized. The filtration is conducted at a temperature of preferably about 5° to about 20° C., and most preferably 5° through 10° C.

Particulate Novolac Properties

The product of the processes described above is a particulate novolac resin material exhibiting chemical and physical properties which can be analyzed using standard procedures known to those skilled in the art, such as tripod flow, gel time, plate flow, nuclear magnetic resonance (NMR), gel permeation chromatography (GPC), and mechanical glass transition temperature ($T_g$).

Novolac Dispersions

Novolac dispersions are also prepared by the process of the present invention, and may be important in such applications as thermal insulation. The dispersions differ from the particulate novolac described above in that the average particle size is about 1 to 30, with a maximum of 50 microns. As with resole dispersions, the novolac dispersions are maintained as aqueous, non-settling systems. Attempts to isolate dispersions by filtration and drying are not successful due to the fine particle size and lower glass transition temperature of the particulate novolac resin. Novolac dispersions can be made thermosetting by adding hexamethylenetetramine, or another suitable hardener, to the reaction product. Novolac dispersions, either with or without added compounds, show substantially greater retention of reactivity compared with resole resins. Resole dispersions, in contrast, must typically be refrigerated to prevent a rapid loss of reactivity due to chemical reactions occurring at room temperatures, such as self-condensation of methylol groups. The novolac dispersions of the present invention may be prepared utilizing the same condensation, neutralization and particulate formation steps described above, except that lower formaldehyde levels can be used, with about 0.7 to about 0.8 equivalents of formaldehyde to phenolic component being most preferred. Effective amounts of protective colloids can include combinations of gum systems, such as gum arabic and guar gum, which function extremely well in novolac resin dispersions.

EXAMPLES

The following examples illustrate the production of the particulate novolac resins of the present invention. The chemical designations used in the examples are defined as follows:

| Designation | Description |
|---|---|
| Antifoam I | A commercial silicone antifoam compound based on polydimethylsiloxane. |
| Catalyst I | 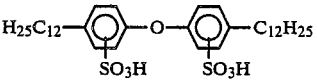 |
| Formaldehyde Ratio | Equals the ratio of the amount of formaldehyde present at an indicated time from the initiation of the condensation reaction over the amount of formaldehyde initially present. |
| Formalin | An aqueous solution containing 50% formaldehyde. |
| GPC | Gas permeation chromatography |
| Hexa | Hexamethylenetetramine |
| Novolac I, II and III | Particulate novolac phenolic resins prepared according to the process of the present invention as described in Example 8 below, with variations in the amount of water utilized or in reaction vessel size. |
| Novolac IV | A commercial novolac phenolic resin of moderate molecular weight having a formaldehyde phenol ratio of .79. |
| Novolac V | A commercial novolac phenolic resin of high molecular weight having a formaldehyde/phenol ratio .83. |
| Novolac VI | A commercial novolac phenolic resin of very high molecular weight having a formaldehyde/phenol ratio of .84. |
| Phenol | Monohydroxybenzene |
| $T_g$ | Glass transition temperature, determined by dynamic mechanical analysis |

Example 1

The formulation in Table 2 sets forth the amount of components used during the particulate novolac resin formation procedure. The formulation was selected for convenience, and is not necessarily an optimized formulation for any particular end-use application

TABLE 2

| | Reaction Formulation | |
|---|---|---|
| Component | Parts, by weight | Grams per 1-liter batch |
| Phenol | 100 | 200 |
| Formalin | 51 | 102 |
| Catalyst I | 0.8 | 1.6 |
| Guar gum | 1.0 | 2.0 |
| Distilled water | 100 | 200 |
| 25% NaOH | 0.8 | 1.6 |

This formulation contained 0.80 equivalents of methylene per mole of phenol. The experimental procedure is the following:

The phenol was initially weighed into a 1 liter flask which was equipped with a motor-driven paddle stirrer, a thermometer, and a reflux condenser. Catalyst I was added and the mixture heated to 95° C. After this temperature is achieved, Formalin is added to the mixture, raising the temperature to 107° C., before stabilizing at approximately 100° C. Approximately 45 minutes after the Formalin was initially added to the mixture, the originally clear solution become very opaque, signifying the "cloud point". The Formalin addition was completed, and refluxing was continued. Nearly two hours later the mixture was removed from heating, and the 25% NaOH was added to the batch with stirring for approximately 5 minutes, to achieve a pH of around 7. The Guar gum was then added, and the mixture reheated to 95° C. Within a few minutes, a dispersion is well formed. One drop of Antifoam I was then added to the mixture. An atmospheric steam distillation was then begun, and continued for approximately 1 hour, removing 363 grams of distillate and steam condensate. The batch was then cooled in an ice bath to approximately 15° C. The mixture was then filtered, reslurried with 300 ml of water and filtered again in a Buchner funnel. A portion of the particulate solid product was dried in a rotary evaporator for approximately 3 hours under occasional heating. The resulting dried resin, when combined with 10% hexa, exhibited a gel time (at 150° C.) of 75 seconds, and a plate flow (at 125° C.) of 25 mm.

Example 2

This example illustrates the process of the present invention without a dephenolation step. A formulation substantially like the one in Example 1 was used, except that the amount of Catalyst I was only 1 gram, and the protective colloid was gum arabic instead of the guar gum used in the Example 1. The procedure followed was substantially similar to that in Example 1 as follows: the phenol and formalin reactants were charged to a reaction flask; the mixture was refluxed for approximately 4 hours; neutralized with NaOH solution; the gum arabic was added, under continuous agitation; the resulting particulate novolac resin was cooled, filtered, and washed. The product consisted of large particles of novolac resin. The particulate novolac resin was allowed to air dry overnight, subjected to fluid bed drying at room temperature up to 60° C., resulting in a product having particles of approximately 500 to 1000 microns in size. Analysis of the particulate novolac resin product, containing 10% hexa, provided a gel time of 90 seconds and a plate flow of 78 mm.

Example 3

This example illustrates and analyzes the process of the present invention using a dephenolation step to remove phenolic reactant from the particulate novolac resin prior to isolation. Substantially the same formulation of components was used as that described in Example 1, except that the amount of Catalyst I was increased to 2.5 grams (i.e., 1.25 parts by weight), and guar gum was replaced by a solution containing 4 grams (i.e., 2.0 parts by weight) of gum arabic in 16 millimeters of distilled water. The procedure was similar to the one described in Example 1 except that the amount of caustic added during the neutralization step to achieve a pH of approximately 7, was 2.0 grams. After the addition of the gum arabic, stem distillation was initiated at 100° C. In order to avoid foaming of the mixture during dephenolation, it was discovered that the presence of an antifoaming agent, such as Antiform I, or that control of heat input and steam injection kept to a minimum, would avoid loss of the particulate solid suspension. After an hour of distillation, the mixture was removed from heat and placed in an ice water bath at around 15° C. One hundred milliliters of water were added during cooling to replace the water lost during distillation. The particulate novolac resin product was then isolated using filtration and drying. Analysis of the particulate novolac resin, mixed with approximately 10% hexa, produced a gel time of around 90 seconds at 150° C., and a plate flow of around 35 mm at 125° C. A GPC of the dried particulate novolac resin indicated a 4.2% free-phenol content, a number average molecular weight of 580 and a weight average molecular weight of 19,700. The particulate novolac resin product exhibited a $T_g$ of 66.5° C., determined by dynamic mechanical analysis.

Example 4

An additional experiment was conducted using substantially the formulation and procedures set forth in Example 3, wherein samples of the particulate novolac resin were removed at various times during the dephenolation step as shown in Table 3 below. Each sample was recovered by cooling the sample for approximately 15 minutes in a cold water bath, following by decanting off the aqueous solution. Distilled water was then added and the sample was stirred for approximately 5 minutes and again placed in a cold water bath to allow the particulate novolac resin solids to settle. After decanting off the water, the wet solids were placed in a Buchner funnel to undergo vacuum filtration, followed by drying at room temperature for approximately 30 minutes. The results indicate that beginning with a free-phenol content of 5%, the disappearance of phenol from the resin follows approximately first order kinetics establishing a half-time for loss of phenol of about 1.8 hours. In other experiments, the half-time can approach 1 hour.

TABLE 3

| | Dephenolation By Steam Distillation | | |
|---|---|---|---|
| Dephenolation | Phenol, | Molecular Weight | |
| Time, hours | % | Number Average | Weight Average |
| 0 | 5.0 | 680 | 40,600 |
| 1 | 3.6 | 760 | 39,800 |
| 2 | 2.5 | 860 | 39,300 |
| 3 | 1.7 | 970 | 38,700 |
| 3.5 | 1.4 | 960 | 37,600 |

Example 5

This example was conducted using substantially the formulation and procedures set forth in Example 3, except that 4 grams (i.e., 2 parts by weight) of gum ghatti in 40 milliliters (i.e., 20 parts by weight) distilled water, were used in placed of the gum arabic in Example 3. The particulate novolac resin product exhibited a tripod flow time of 110 seconds at 150° C. When mixed with 10 parts hexa to 100 parts of resin, the particulate novolac exhibited a gel time of 83 to 86 seconds at 150° C., and a plate flow of 32 mm at 125° C. A GPC analysis indicated 3.9% of free phenol, a number average molecular weight of 600, and a weight average molecular weight 23,700. An average $T_g$ was determined to be 68.0° C.

Example 6

The formulations and procedures set forth in Example 5 were followed except that gum ghatti was replaced with guar gum. Analysis of the particulate novolac resin product indicated a tripod flow value of 116 seconds at 150° C. Mixtures of 100 parts resin with 10 parts hexa exhibited gel times of between 83 to 85 seconds at 150° C., and plate flow values of 19 mm at 125° C. A GPC indicated a 3.2% free phenol content, a number average molecular weight of 610, and a weight average molecular weight of 22,500. A mechanical $T_g$ value was determined to be 72.0° C.

Example 7

In this example, the relative effectiveness of various catalysts are compared by measuring the disappearance of formaldehyde over time, and by determining the rate constants and half-lives for the disappearance of the formaldehyde. The formulations and procedures are essentially those as described in Example 1, except that the Catalyst I was replaced, or altered in amount, as shown in Table 4 as follows:

TABLE 4

| | | | Catalyst Effects | | | | | | | | | |
|---|---|---|---|---|---|---|---|---|---|---|---|---|
| Catalyst[a] | Weight Parts, per 100 parts phenol | Weight Parts H$_2$O, per 100 parts phenol | Formaldehyde Ratio Over Time, hours | | | | | | | | Rate of Formaldehyde Disappearance, hr.$^{-1}$ | Formaldehyde Half-Life, hours | Time to 97% Reacted, hours |
| | | | 1 | 2 | 2.5 | 3.25 | 4 | 5 | 6 | 7 | | | |
| Catalyst I | 1.25 | 100 | — | — | 0.047 | — | 0.012 | 0.006 | — | 0.006 | 1.15 | 0.60 | 3.0 |
| Catalyst I | 1.25 | 50 | 0.082 | 0.009 | — | 0.001 | — | — | — | — | 2.35 | 0.29 | 1.5 |
| H$_2$SO$_4$ | 0.1 | 100 | — | — | 0.318 | — | 0.247 | 0.211 | — | 0.164 | 0.33 | 2.12 | 10.6 |
| H$_2$SO$_4$[b] | 0.1 | 100 | — | — | 0.235 | — | 0.082 | 0.041 | 0.024 | 0.012 | 0.63 | 1.11 | 5.6 |
| Phenol-sulfonic | 0.1 | 100 | — | 0.324 | — | — | 0.191 | 0.134 | — | 0.041 | 0.45 | 1.52 | 7.6 |

TABLE 4-continued

| | | | Catalyst Effects | | | | | | | | |
|---|---|---|---|---|---|---|---|---|---|---|---|
| Catalyst[a] | Weight Parts, per 100 parts phenol | Weight Parts $H_2O$, per 100 parts phenol | Formaldehyde Ratio Over Time, hours | | | | | | Rate of Formaldehyde Disappearance, hr.$^{-1}$ | Formaldehyde Half-Life, hours | Time to 97% Reacted, hours |
| | | | 1 | 2 | 2.5 | 3.25 | 4 | 5 | 6 | 7 | |
| Acid | | | | | | | | | | | |

[a] providing 2.0 meq. of [H$^+$] per 100 g of phenol
[b] containing 1.0 weight parts sodium xylene sulfonate It can be seen that the slowest reactions occur when $H_2SO_4$ and phenolsulfonic acid are employed as the catalysts. Addition of sodium xylene sulfonate surfactant can double this rate. The fastest reaction rates occur when utilizing the preferred dodecyl diphenol oxide sulfonic acid, Catalyst I, as described above. The reaction rate can also be enhanced by reducing the amount of water preent, i.e., raising the level of organics.

Example 8

Following the experimental procedure and formulation in Example 1, the molecular weight distribution of the novolac resin was monitored over time using gel permeation chromatography, GPC. These results, listed in Table 5, show that the reaction is essentially over after 4 hours. The final free phenol content is in a range of 6 to 7 percent. This high level causes substantial particle "plasticization" by lowering the glass transition temperatures, $T_g$, with the result that substantial agglomeration occurs when the particulated resin is isolated.

TABLE 5

| Dependence of Molecular Weight on Reaction Time[a] | | | |
|---|---|---|---|
| Reaction Time, hours | Free Phenol, % | Number Average Molecular Weight, $\overline{M}_n$ | Weight Average Molecular Weight, $\overline{M}_w$ |
| 2 | 12.8 | 260 | 870 |
| 3 | 8.5 | 370 | 3,000 |
| 4 | 7.5 | 430 | 11,300 |
| 5 | 6.8 | 460 | 14,800 |
| 6 | 6.7 | 470 | 17,000 |
| 7 | 6.4 | 470 | 18,000 |

[a] for a reaction batch with 50% by weight organics, and 1.25 parts by weight of Catalyst I.

Example 9

This example, with the results listed in Table 6, demonstrates that the mean particle size of the particulate novolac resin can be varied depending upon the type of protective colloid utilized, the amount of the protective colloid, and the relative amount of formaldehyde to phenol used. The particle size of the novolac resin, which was produced using substantially the formulations and procedures set forth in Example 1, can be decreased by utilizing greater amounts of protective colloid, or by reducing the formaldehyde to phenol ratio. The particle size is also progressively decreased by utilizing guar gum, in place of gum ghatti, and gum arabic. The increase in particle size due to higher ratios of formaldehyde to phenol is due to the increased melt viscosity that the novolac resin exhibits at the higher molecular weight. Particle size may also be dependent upon the amount of shear in the reaction system,, such that increased agitation would produce particles having smaller diameters, as well as the amount of water utilized.

TABLE 6

| Protective Colloid | Parts, by weight per 100 parts phenol | Formaldehyde/ Phenol Ratio | Particle Size, Mean | Microns Range |
|---|---|---|---|---|
| Gum arabic | 2.0 | 0.80 | 1000 | — |
| Gum ghatti | 2.0 | 0.80 | 500 | — |
| Guar gum | 2.0 | 0.80 | 50 | 5–100 |
| Guar gum | 1.0 | 0.80 | 125 | 10–300 |
| Guar gum | 1.0 | 0.818 | 200 | 10–500 |
| Guar gum | 1.0 | 0.786 | 100 | 10–200 |

Example 10

An analysis comparing the physical properties of various particulate novolac resins produced from some of the procedures described above, with conventional novolac resins is presented in Table 7. The results demonstrate the breadth of properties which can be obtained by selecting the desired parameters within a wide range of formulations and conditions falling within the procedures set forth in the present invention. The physical properties of the particulate novolac resins produced by the process of the present invention can span both the conventional low molecular weight and high molecular weight novolac resins of the prior art.

TABLE 7

| | Physical Properties of Novolac Resins | | | | | | |
|---|---|---|---|---|---|---|---|
| Resin | Tripod Flow at 150° C., seconds | Gel Time, seconds | Plate Flow, mm | Free Phenol, % | Number Average Molecular Weight | Weight Average Molecular Weight | Glass Transition Temperature, °C. |
| Example 3 | 93 | 91 | 36 | 4.3 | 580 | 19,700 | 66 |
| Example 4 | 110 | 84 | 32 | 3.9 | 600 | 23,700 | 68 |
| Example 5 | 116 | 84 | 19 | 3.2 | 610 | 24,500 | 72 |
| Example 8[a] | 92 | 95 | 36 | 4.5 | 550 | 19,400 | 65 |
| Example 8[b] | 112 | 76 | 25 | 2.9 | 730 | 16,800 | 70 |
| Novolac I | 87 | 112 | 40 | 3.5 | 660 | 9,900 | 68 |
| Example 8[c] | 67 | 93 | 51 | 4.2 | 590 | 11,000 | 58 |
| Example 6[d] | 82 | 124 | 45 | 3.9 | 580 | 4,500 | 61 |
| Novolac II | 100 | 91 | 27 | 3.9 | 600 | 13,000 | 71 |
| Novolac III | 126 | 83 | 23 | 4.4 | 730 | 39,700 | 74 |
| Novolac IV | 63 | 96 | 72 | 5.7 | 450 | 22,400 | 66 |
| Novolac V | 100 | 106 | 36 | 2.4 | 660 | 16,300 | 78 |

TABLE 7-continued

Physical Properties of Novolac Resins

| Resin | Tripod Flow at 150° C., seconds | Gel Time, seconds | Plate Flow, mm | Free Phenol, % | Number Average Molecular Weight | Weight Average Molecular Weight | Glass Transition Temperature, °C. |
|---|---|---|---|---|---|---|---|
| Novolac VI | 140 | (115–150)[e] | (15–20)[e] | 2.6 | 770 | 18,500 | 74 |

[a]Using guar gum, having a formaldehyde/phenol ratio of 2.80
[b]Using guar gum, having a formaldehyde/phenol ratio of 0.818
[c]Using guar gum, having a formaldehyde/phenol ratio of 0.786
[d]Using 1.25 parts Catalyst I with 50 parts $H_2O$
[e]value within designated range

Example 11

This example sets forth that part of the invention directed to the productio of particulate novolac resin aqueous dispersions. The formulation in Table 8 sets forth the amount of components used during the particulate novolac resin formation procedure. The formulation was selected for convenience, and is not necessarily an optimized formulation for any particular end use application.

TABLE 8

Reaction Formulation

| Component | Parts, by Weight | Grams per 1-Liter Batch |
|---|---|---|
| Phenol | 100 | 200 |
| Formalin | 48 | 96.8* |
| Catalyst I | 0.8 | 1.6 |
| Gum Arabic | 2.0 | 4.0 |
| Guar Gum | 2.0 | 4.0 |
| Distilled Water | 100 | 200 |
| 25% NaOH | 1.25 | 2.5 |

*Weight corrected for 49.6% assay

The procedure entailed weighing the phenol into a one liter flask equipped with a motor-driven paddle stirrer, a thermometer and a reflux condenser. Catalyst I was added and the mixture heated to 95° C. After this temperaure is reached, Formalin is added drop-wise for one hour, with the addition raising the reaction temperature to as high as 104° C. Approximately 45 minutes after the Formalin was initially added to the mixture, the originally clear solution became very opaque, signifying the "cloud point". The Formalin addition was completed, and the mixture heated to reflux. After just over an hour of refluxing, the 25% NaOH was added to the batch to achieve a pH of approximately 8. The gum arabic in aqueous solution was then added and the mixture reheated to refluxing. After an hour of refluxing at 100° C., the mixture was cooled to 80° C. in a water bath. A photomicrograph of a sample at this time indicated a particle size of up to 300 microns. The guar gum was then added to the mixture with mixing for approximately thirty minutes. Another sample photomicrograph indicated particle sizes less than 20 microns, and a mean particle size of approximately 10 microns. The viscous mixture was then cooled to 40° C. and discharged into a containing vessel.

Example 12

An additional experiment was conducted using substantially the formulation and procedures set forth in Example 11, except that the amount of guar gum added was varied as shown in Table 9 below.

TABLE 9

| Parts Guar Gum/ 100 Parts Phenol | Dispersion Particle Size | |
|---|---|---|
| | Mean, microns | Maximum, microns |
| None | 300 | 600 |
| 0.5 | 100 | 300 |
| 0.75 | 50 | 90 |
| 1.0 | 20 | 30 |
| 2.0 | 10 | 20 |

An analysis of 20.0 grams of the resin dispersion was conducted by dissolving 1.02 grams of Hexa therein. A 150° C. hot plate gel time of an average of 118 seconds was observed.

Example 13

This example was conducted using substantially the formulation and procedures set forth in Example 11, except that the amount of Formalin was raised to 51.0 parts (102.8 grams) and the amount of guar gum was lowered to 1.25 parts (2.5 grams). A sample photomicrograph indicated that the particulate novolac resin aqueous dispersion contained particle sizes up to 50 microns, with an average particle size of approximately 30 microns. Analysis of 1.02 grams of Hexa dissolved in 20.0 grams of resin dispersion produced hot plate gel times for two trial runs of 107 and 104 seconds, at 150° C.

Example 14

This example was conducted using substantially the formulation and procedures set forth in Example 11, except that the gum arabic was replaced with gum ghatti, and the guar gum level was cut in half to 1.0 parts (2.0 grams). The particulate novolac resin aqueous dispersion that was produced was readily water dilutable, and a photomicrograph of the sample indicated particle sizes of up to 30 to 40 microns, with a mean particle size of approximately 15 microns. An analysis of 20.0 grams of the resins dispersion with 1.2 grams of Hexa dissolved therein showed hot plate gel times, at 150° C. of 116 and 112 seconds.

The results show that it is possible to alter resin molecular weight and gum combinations while still obtaining dispersions having small particle size distributions.

I claim:

1. A process for producing particulate novolac resin comprising steps of: (a) condensing phenol with an aldehyde in the presence of a catalyst under acidic conditions to produce a novolac resin; (b) adding water before, during or after the condensation reaction step (a) to provide a novolac resin/water mixture; (c) neutralizing the acid catalyzed novolac resin using a base; (d) forming a particulate novolac resin dispersion by adding an effective amount of protective colloid to the aqueous mixture wherein the protective colloid is a polysaccharide selected from the group consisting of gum arabic, gum ghatti, gum tragacanth, and guar gum or it hydroxypropylate derivative; and (e) isolating the particulate novolac resin from the aqueous dispersion; said process including dephenolating the particulate novolac resin by separating out a sufficient amount of unreacted phenol prior to isolation of the resin so that less than about 6 percent of unreacted phenol remains in the dispersion.

2. A process for producing particulate novolac resin comprising the steps of: (a) condensing phenol with an aldehyde in the presence of an alkylated diphenyl oxide sulfonic acid or its corresponding salt as the catalyst under acidic conditions to produce a novolac resin; (b) adding water before, during or after the condensation reaction step (a) to provide a novolac resin/water mixture; (c) neutralizing the acid catalyzed novolac resin using a base; (d) forming a particulate novolac resin dispersion by adding an effective amount of protective colloid to the aqueous mixture wherein the protective colloid is a polysaccharide selected from the group consisting of gum arabic, gum ghatti, gum tragacanth, and guar gum or its hydroxypropylate derivative; and (e) isolating the particulate novolac resin from the aqueous dispersion.

3. A particulate novolac resin aqueous dispersion comprising: (1) the acid catalyzed condensation product of phenol and an aldehyde; (2) a neutralizing agent; (3) a protective colloid which is a polysaccharide selected from the group consisting of gum arabic, gum ghatti, gum tragacanth, and guar gum or its hydroxypropylate derivartive; (4) a catalyst comprising an alkylated diphenyl oxide sulfonic acid or its corresponding salt; and (5) a sufficient amount of water to produce a resin-in-water dispersion.

4. A process as defined in claim 1, wherein step (a) is conducted in an aqueous medium and using a micellar catalyst.

* * * * *